(12) United States Patent
Bekele

(10) Patent No.: US 10,092,011 B1
(45) Date of Patent: Oct. 9, 2018

(54) SCALABLE SEMI-AUTOMATED INJERA MAKING SYSTEM

(71) Applicant: Girma Mulat Bekele, Morgan Hill, CA (US)

(72) Inventor: Girma Mulat Bekele, Morgan Hill, CA (US)

(73) Assignee: Girma Mulat Bekele, Morgan Hill, CA (US)

( * ) Notice: Subject to any disclaimer, the term of this patent is extended or adjusted under 35 U.S.C. 154(b) by 265 days.

(21) Appl. No.: 15/139,773

(22) Filed: Apr. 27, 2016

(51) Int. Cl.
*A21C 9/00* (2006.01)
*A21C 9/08* (2006.01)

(52) U.S. Cl.
CPC ...................................... *A21C 9/08* (2013.01)

(58) Field of Classification Search
USPC .................................. 426/496, 505; 99/334
See application file for complete search history.

(56) References Cited

U.S. PATENT DOCUMENTS

| 9,815,191 B2* | 11/2017 | Oleynik | B25J 9/0081 |
| 2003/0143309 A1* | 7/2003 | Kindie | A21B 7/00 426/496 |
| 2004/0096556 A1* | 5/2004 | Admassu | A21D 8/06 426/496 |
| 2005/0208183 A1* | 9/2005 | Desalegn | A21D 8/06 426/94 |
| 2011/0189364 A1* | 8/2011 | Mulugeta | A21B 1/44 426/505 |
| 2012/0247344 A1* | 10/2012 | Ma | A21B 1/48 99/352 |
| 2017/0181575 A1* | 6/2017 | Asfaw | A47J 27/004 |
| 2018/0043526 A1* | 2/2018 | Oleynik | G05B 19/42 |

* cited by examiner

*Primary Examiner* — Nina Bhat

(57) ABSTRACT

A thin, flat bread-making machine targeted at the Ethiopian bread called Injera, including apparatus, methods and processes. The machine includes cooking surface stations, batter depositing apparatus and cover moving robot. A moving batter depositing apparatus deposits a batter at a stationary griddles followed by placing covers for a specified time to complete the cooking. When cooking is completed an apparatus/robot will remove the covers and the system alerts the end of the process to the operator. Removing the Injera from the machine manually and repeating the whole process again will complete the Injera making process.

6 Claims, 3 Drawing Sheets

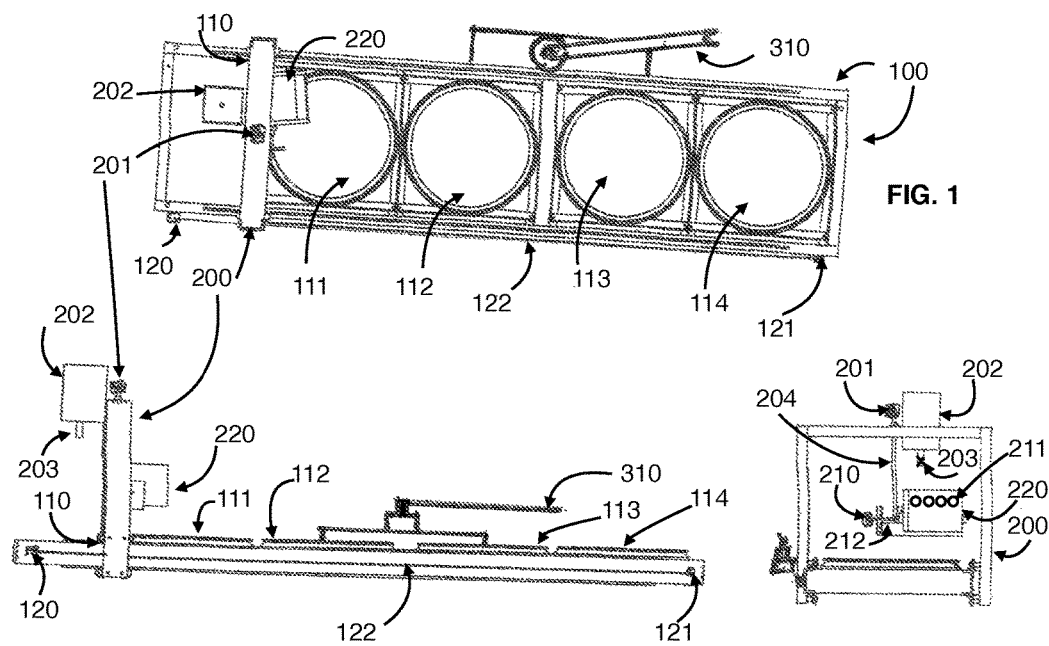
FIG. 1
FIG. 2    FIG. 3
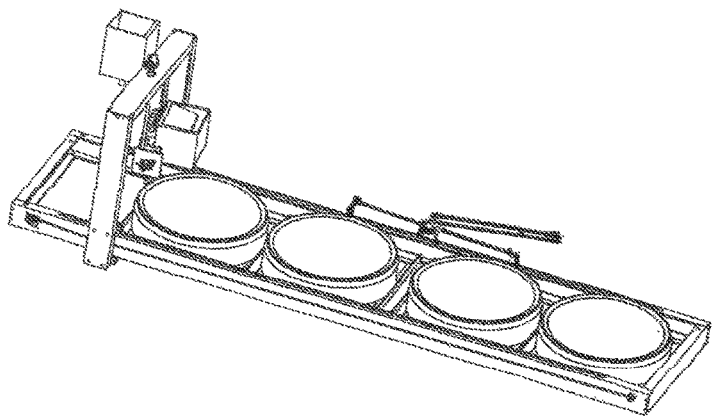
FIG. 4

SCALABLE SEMI-AUTOMATED INJERA MAKING SYSTEM

BACKGROUND OF THE INVENTION

Injera is a sourdough risen flat bread that is primarily an Ethiopian staple food, but increasingly becoming popular in Ethiopia's neighboring countries and around the world. Injera is made of a grain called Teff but increasingly other grains by themselves or mixed with Teff are being used in making Injera. Injera is soft, thin and flexible with porous features (eyes) on one side and smooth on the other. It is large in diameter usually ranging from 12 to 24 inches. Injera requires a fermented batter with a right chemistry to fulfill the above features.

Traditionally the process of making Injera requires 3 steps.

Step 1: Spreading a thin batter on a hot non-sticking griddle or earthenware in a thin and uniform manner over a large diameter surface.

Step 2: Put a cover on top of the griddle, effectively creating a dome, that traps the steam from the cooking batter hence making it soft. While cooking, the fermented batter on a hot griddle creates a porous surface on top and a smooth surface at the bottom.

Step 3: After a certain amount of time, the cover is removed and the Injera will be taken off-of the griddle to be cooled down.

The soft, thin and large size nature of Injera makes it hard to flip or push as it is done in making pancakes, tortillas or other breads. Therefore an automated machine that can be utilized to make Injera has been very challenging.

Of the three steps mentioned above, this invention emphasizes on the first important step. The second step can be achieved easily by employing any pick and place robot arm that does not need any invention. But the third step, removing and cooling, still to be done manually, may need another invention in the future.

Therefore this semi-automated invention will greatly solve the most challenging part of the Injera making process—The first step mentioned above. When this step is laid out in multiple stations, it lends itself to be used in mass production of Injera to the satisfaction of customers. This system also can be used for other flat thin breads that have low viscosity batter.

Prior patents e.g. U.S. Pat. No. 7,421,943 B1 and U.S. Pat. No. 7,063,008 B2, to the best of the inventor's knowledge, did not address sufficiently the problem of spreading the batter on the hot surface/griddle, which is one of the main inventions of this art described here.

In case of Injera Manufacturing System (U.S. Pat. No. 7,063,008 B2) the spreading utilizes air or air pressure to accomplish the spreading. The use of air to spread the batter will have undesirable effect on the forming of the porous top surface (eyes), which has a negative impact on the characteristics of the Injera.

Moreover, in case of Injera Manufacturing System, the batter is being spread and cooked to make Injera while it is on a conveyor system. In this invention the batter spreading and cooking of the Injera is performed on a stationary griddle/hot surface while the batter-spreading embodiment is moving.

In case of Injera Baking Machine (U.S. Pat. No. 7,421,943 B1) the spreading is done in a spiral way. Compared to a single circular motion of this invention, the spiral way takes time that will have a cook time uniformity issue, which will have an impact on the quality of the Injera. Also the Injera Baking Machine is a single-station baking machine that doesn't lend itself well to mass production. Moreover it does not mention one of the most important steps, having a cover during cooking.

BRIEF SUMMARY/DESCRIPTION OF THE INVENTION

The objective of this invention is to reduce labor-intensive work of making Injera by automating key process steps thereby enabling mass-production. The main steps of making Injera manually are composed of:
1. Spreading the batter over a circular griddle-cooking surface.
2. Covering and waiting for the Injera cooking to be completed and removing the cover.
3. Removing the Injera from the griddle-cooking surface.

This invention will automate the first two steps of the three main steps.

The invention will have a platform that can carry 4 or more griddles and an extra "ready" station. On top of this platform, it will have a machine that moves above each station and spread the batter over the griddles one after another. After each spreading of the batter on each griddle, the batter will be transferred from the batter holding container to the batter spreading apparatus. When the spreading of the batter is completed, the batter-spreading embodiment moves to the initial "ready" station. In the next process another automated machine/robot will pick the cover from a shelf and place the cover on top of each griddle. The cooking process starts. The system will start a timer for cooking. Once the timer is up, the robot will pick the covers from the griddle and will put it back on the shelf. Once this is completed, it will alert the operator so that the operator remove the Injera and the whole process begins again with a simple "start" switch. During the wait/cook time, the batter will be transferred to the batter holding container.

BRIEF DESCRIPTION OF THE DRAWINGS

FIG. 1 is the top schematic view of the invention.
FIG. 2 is the side schematic view of the invention.
FIG. 3 is the front schematic view of the invention.
FIG. 4 is the perspective view of the invention.

DETAILED DESCRIPTION OF THE PREFERRED EMBODIMENT

Figure 5:
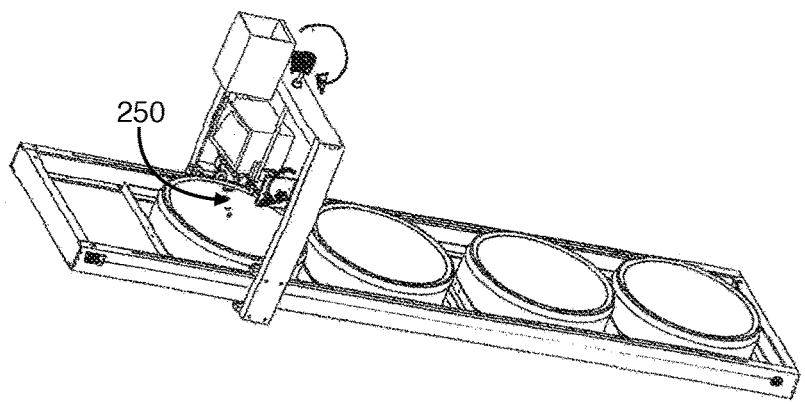
FIG. 5 to FIG. 8 is the view of batter delivery process at different stages on one station.
Figure 6:
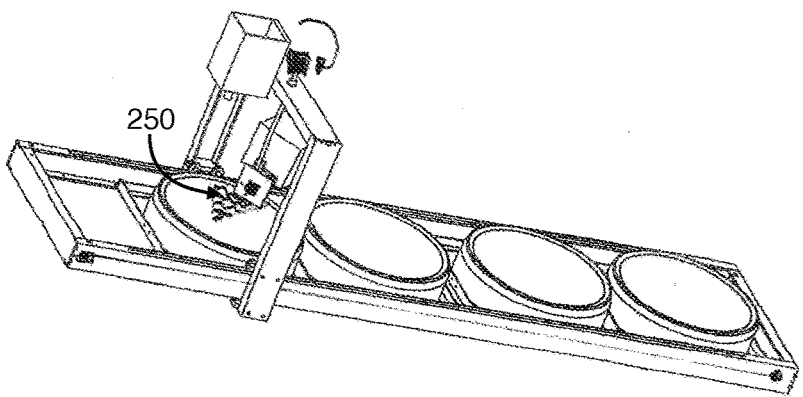
Figure 7:
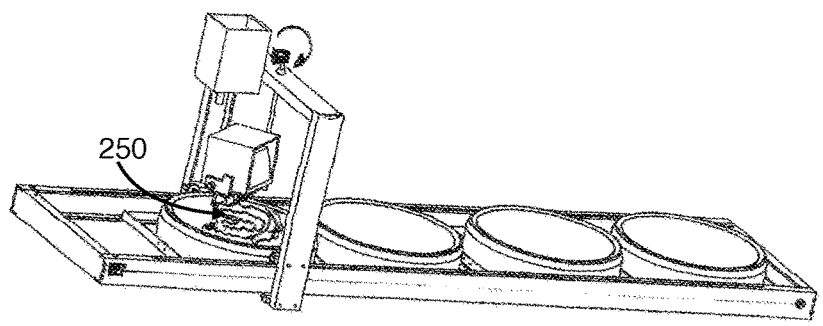
Figure 8:
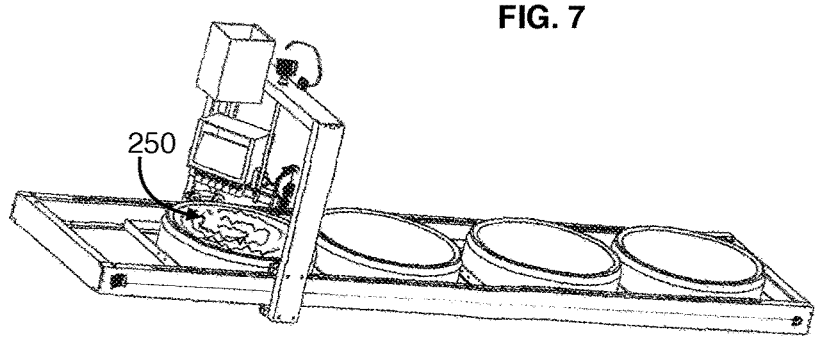

In general there are two steps in this invention as it was being done traditionally for years.
Step 1 is the batter delivery step done by the batter-spreading embodiment
Step 2 is the cooking step
A "start" switch to the controller will start those two steps. On step one, after receiving the start switch, the batter-spreading embodiment moves to station one and starts the process of delivering the batter to the griddle/Hot surface (FIG. 5-FIG. 8). Once completed, it will continue to the second station. After finishing at the second station, it will move on to the third and fourth stations (FIG. 9-FIG. 13).

After completing delivering the batter in a thin and uniform manner over all the griddles/hot surfaces, it will return to it's ready position and the second step will be starting.

On step 2 the XYZ and rotational moving robot hand will move the covers to put on top of the griddles and a cooking timer will be initiated by the controller. When the preset cooking timer is expired, the robot hand will move back and pick all the covers back to the shelf it brought them before. Once this process is completed, it will be waiting for the operator to remove the Injera and restart the whole process by pushing the start "switch" again.

Detailed Explanation of Step 1:

At the ready station 110 (FIG. 1), the batter-delivering container 220 moves to position under batter container 202 by motor 201, which is attached to it through the shaft 204 (FIG. 3). Valve 203 opens and the batter flows to batter delivering container 220. Once the level of batter sensed with fluid sensor just below the delivering holes 211, the valve 203 closes, and there will be a batter at batter delivery container 220.

A start switch part of the electronics controller, which is not part of this invention, will be pressed to start the sequences of events. Once pressed, the batter-spreading embodiment 200 moves to position 111 directly at the center and on top of the griddle located at position 111. One way to accomplish the movement of the batter-spreading embodiment 200 is using a motor 120 attached to a timing pulley 121 (at both ends) and a timing belt 122 attached to the spreading embodiment 200 (FIG. 2).

Once on top of the station 111, motor 210 moves batter delivery container 220 to delivery position by rotating the attached shaft 212. At the delivery position holes 211 will point downward delivering the batter on the griddle/hot surface. While the batter is pouring down on the griddle/hot surface motor 201 moves shaft 204 and batter delivering container 220 in one complete circular motion delivering a thin batter 250 covering the whole griddle. See FIG. 5 through FIG. 8. Once the circular motion is completed, motor 201 stops batter delivery container 220 under batter container 202. At the same time, motor 210 reverse direction putting holes 211 to their original position by which batter transfer from the container 202 to the delivery container 220 is possible. The valve 203 opens again and batter flows from the batter container 202 to batter delivery container 220 again for the coming delivery at the next station.

Figure 9:
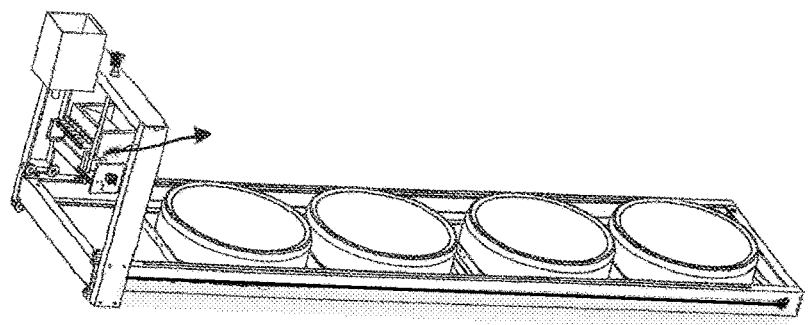
FIG. 9 to FIG. 13 is the view of the batter-spreading embodiment at different stations.
Figure 10:
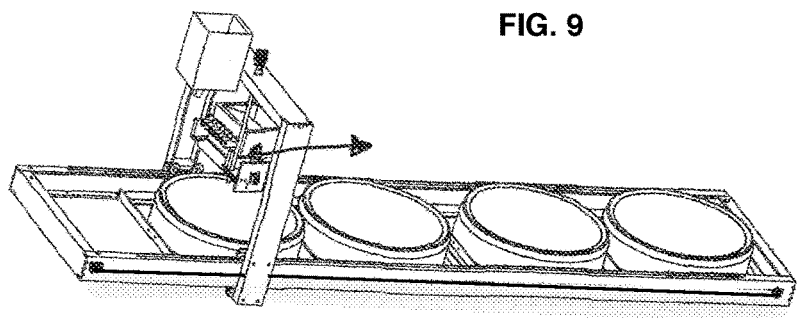
Figure 11:
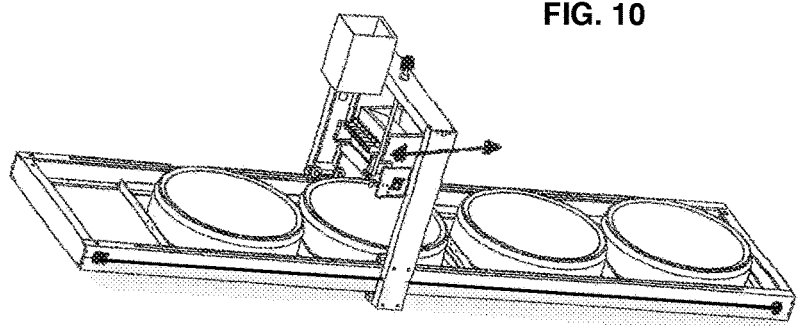
Figure 12:
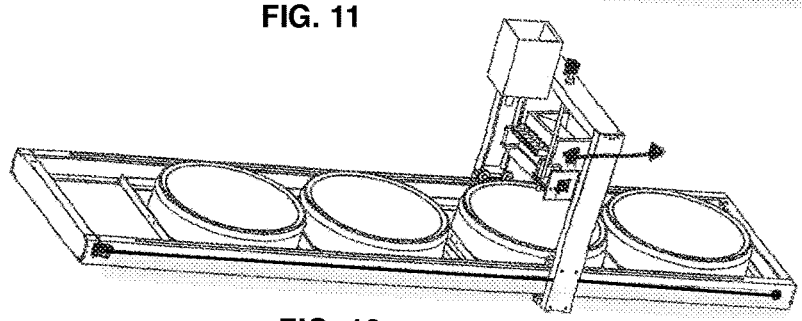
Figure 13:
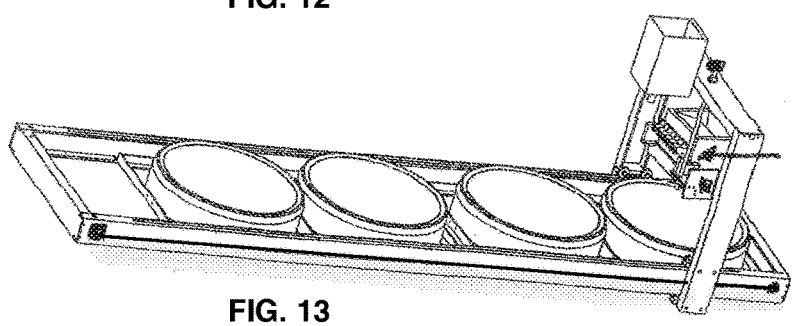

The above steps will be repeated by moving the batter-spreading embodiment 200 at stations 112, 113 and 114. That is depicted at FIG. 9. through FIG. 13.

Explanation of Step 2.

Once the delivery of the batter is completed, the cover will be placed by the robot arm 310 (FIG. 1) on but not limited to the griddle/hot surface at stations 111, 112, 113 and 114. After a specific time the robot arm 310 will pick the covers and the process will be completed. By this time the all Injeras are cooked and a human operator collects the Injera and will start the process all over again. In this step the x,y,z and rotational moving robot is not part of this invention. It has been invented for a long time and it will be incorporated in to this invention. But the set-up and the steps to perform the task will be claimed requiring the explanation of the process.

I claim:

1. A semi-automated injera making apparatus comprising:
   (a) a linearly disposed platform wherein said platform includes a plurality of heated griddle surfaces for cooking injera;
   (b) a linearly moving injera batter dispensing device for dispensing and retaining a quantity of injera batter, said injera batter dispensing device being in operative communication with said platform to dispense said injera batter onto said griddle surfaces;
   (c) a batter spreading device for spreading said injera batter on to said griddle surfaces when said injera batter is dispensed on a respective one of said griddle surfaces;
   (d) a robotic arm device configured to move rotationally and along an X-axis a Y-axis and a Z-axis and being in operative communication with said platform and said griddle surfaces, said robotic arm device for picking up and placing a cover from a shelf onto a respective one of said griddles and removing said cover and replacing said cover back on said shelf based upon a preset cooking time of said injera batter.

2. The semi-automated injera making system of claim 1 wherein said plurality of heated griddle surfaces comprises four to six heated griddle surfaces, each said heated griddle surface disposed on said platform and wherein said platform includes guide rods to carry and linearly move the batter dispensing device in a back and forth motion.

3. The semi-automated injera making system of claim 1, wherein said injera batter dispensing device retains a pre-determined amount of batter to be dispensed on to said plurality of griddle heated surfaces while said dispenser and said platform communicatively move linearly.

4. The semi-automated injera making system of claim 1, wherein said batter dispensing device comprises a container for retaining a quantity of batter, which is inoperative cooperation with said batter spreading device further in communication with said platform and griddle surface wherein said batter spreading device moves in an vertical upward and downward position.

5. The semi-automated injera making system of claim 4, wherein the batter dispensing device and container for retaining said quantity of batter further comprises a fluid sensor in operative connection with said batter dispensing and batter spreading device and platform to control the flow of batter when the platform moves linearly.

6. The semi-automated injera making system of claim 1, wherein the batter dispensing device and injera batter container in communication with said batter spreading device including fluid valves and hoses for dispensing the batter onto said griddle hot surfaces in a uniform thickness.

* * * * *